Dec. 1, 1953
F. A. WYCZALEK
2,660,883
DEVICE FOR DETERMINING BORDERLINE DETONATION
Filed Nov. 19, 1949
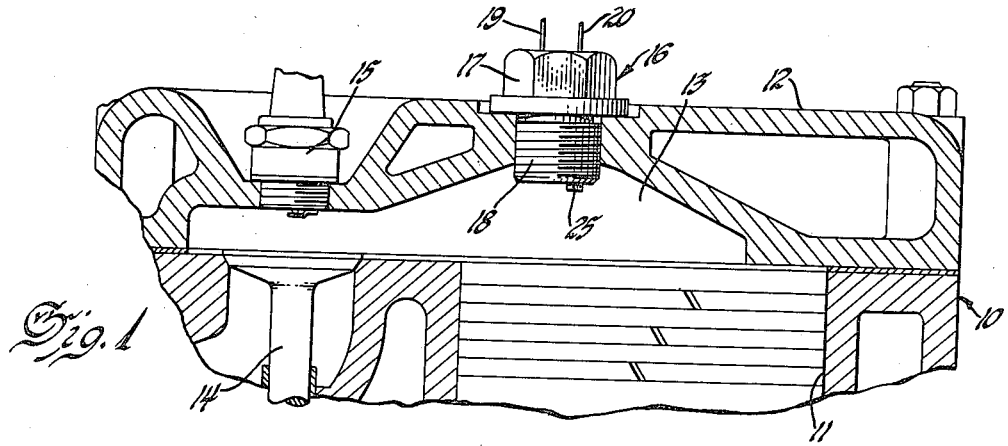
Fig. 1
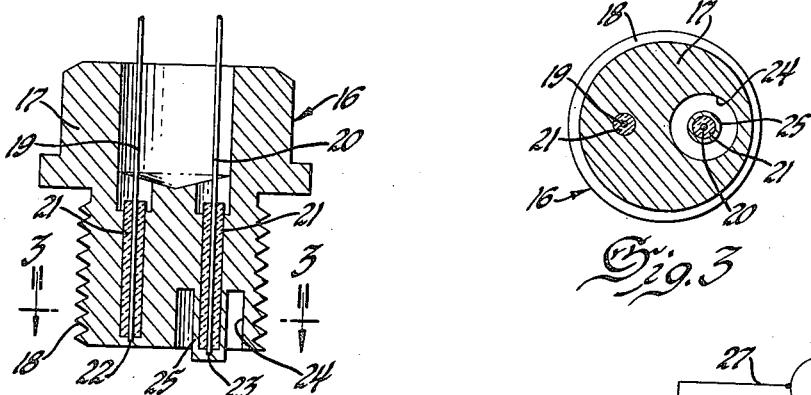
Fig. 2
Fig. 3
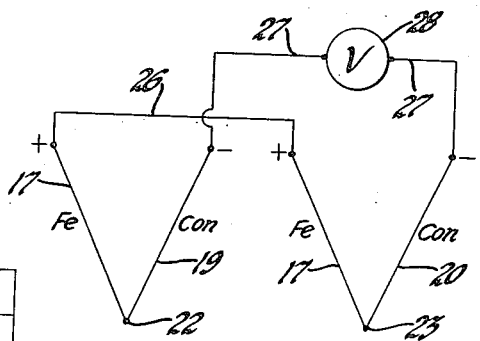
Fig. 4
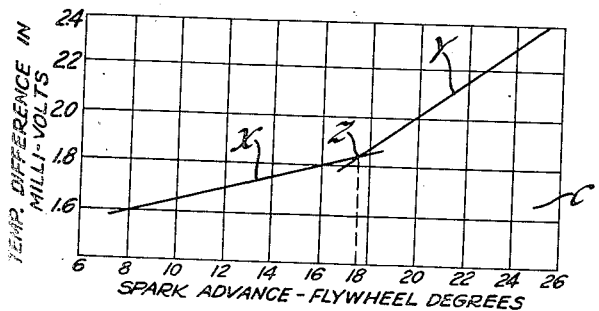
Fig. 5
Inventor
Floyd A. Wyczalek
By
Willits, Helmig & Baillio
Attorneys Patented Dec. 1, 1953

2,660,883

UNITED STATES PATENT OFFICE 2,660,883

DEVICE FOR DETERMINING BORDERLINE DETONATION

Floyd A. Wyczalek, Flint, Mich., assignor to General Motors Corporation, Detroit, Mich., a corporation of Delaware Application November 19, 1949, Serial No. 128,347

2 Claims. (Cl. 73—35)

This invention relates to devices for determining borderline detonation and is employed in rating fuel and measuring octane requirements of fuel used in internal combustion engines.

As is well known detonation in an internal combustion engine is a type of abnormally rapid combustion replacing or occurring simultaneously with normal combustion, and is manifested by over-heating of the engine, loss of power, rough operation, and a characteristic sharp ringing sound called "knock." Therefore, it is desirable that detonation be eliminated or avoided as completely as possible.

In rating fuels and measuring octane requirements by the borderline method, it is important to be able to determine the spark advance at which detonation begins more accurately than can be done by the human ear. The herein described device furnishes a means of accurately locating the beginning of detonation.

In accordance with this invention, the point of onset of detonation is accurately determined by a temperature differential indicator which depends upon the stabilized existence of a difference in temperature between two registering points of a pickup exposed to the temperature in the combustion chamber of the engine. These temperature registering means are preferably in the form of thermocouples so constructed that the rate of heat transfer of one temperature registering point is substantially lower than the rate of heat transfer of the other temperature registering point. This may be accomplished by recessing the body or shell of the thermocouple adjacent the hot junction of one of the thermocouples to provide a heat dam thereabout. With such an arrangement a temperature differential will exist in the hot junctions of the two thermocouples when exposed to the hot gases in the combustion chamber of the engine.

In order to measure this temperature difference the two thermocouples are connected or wired in series opposing and a current-actuated device such as a millivoltmeter is connected in series with similar leads from the thermocouples.

The average temperature difference is indicated in millivolts on a voltmeter and may be plotted against the spark advance, shown in flywheel degrees. Under non-detonating conditions, the plot of temperature difference versus spark advance has a given slope. With the onset of detonation, the slope of the curve changes. This gives a plot of two intersecting straight lines, the intersection of which accurately locates the point at which detonation begins. Thus it is possible to rate various fuels against the optimum operation of an engine.

The various objects and advantages of the invention will be made more apparent as this description proceeds, especially when considered in connection with the accompanying drawing, wherein:

Figure 1 is a fragmentary, sectional, elevational view of an internal combustion engine having the thermocouples of this invention associated therewith;

Figure 2 is an enlarged verticle sectional view through the thermocouples;

Figure 3 is a sectional view taken substantially on the plane indicated by line 3—3 of Figure 2;

Figure 4 is a diagram of the circuits involved; and,

Figure 5 is a chart showing typical data obtained in use of the invention.

Referring now to drawing, and particularly to Figure 1 thereof, the reference character 10 indicates an internal combustion engine provided with a cylinder 11, a head 12 and a combustion chamber 13. One of the valves is indicated by the reference character 14, and the reference character 15 indicates one of the spark plugs of the engine.

The reference character 16 indicates a pickup device fixed in the head 12 of the engine having two registering points exposed to the temperature in the combustion chamber 13 of the engine.

The pickup 16, as shown more in detail in Figures 2 and 3, consists of a body or shell 17 having a threaded portion 18 for engagement with the head 12 of the engine. The body or shell 17 is formed of a ferrous material and constitutes the iron conductor of the thermocouples. The other elements of the two thermocouples consist of two constantan members or wires 19 and 20 which pass into the shell or body 17 through insulating sleeves 21. The ends of the constantan wires are percussion welded at their ends to the shell to provide registering points or hot junctions 22 and 23 which in the arrangement illustrated are exposed to the hot gases in the combustion chamber of the engine.

With the arrangement thus far described, two iron-constantan thermocouples 17—19 and 17—20 are provided and these thermocouples are so constructed that the rate of heat transfer of one registering point or junction is substantially lower than the rate of heat transfer of the other registering point or junction. While this differential in the rate of heat transfer at the junctions 22 and 23 may be accomplished in various ways, I have found that the result may be satisfactorily and efficiently obtained by recessing that portion of the shell or body 17 which surrounds one of the junctions, in the present instance illustrated as junction 23. Thus the body 17 is formed with a recess 24 immediately surrounding the junction 23 leaving a relatively thin tubular portion 25 at this junction or registering point 23. This provides what in effect is a heat dam about this junction or registering point.

With this arrangement, junction or registering point 23 has a relatively low rate of heat transfer as compared to the rate of heat transfer at the junction or registering point 22. Therefore, junction 23 will be at a higher temperature than junction 22 when the pickup is exposed to the hot gases in the combustion chamber of the engine. Consequently, there will be a stabilized difference in temperature between the junctions of the two thermocouples which may be measured in millivolts on a voltmeter.

To measure this temperature difference the two thermocouples are connected or wired in series opposing and a current-actuated device such as a millivoltmeter is connected in series with similar leads from the thermocouples. Thus as shown in Figure 4, the positive sides of the thermocouples are connected by a wire 26 and the negative sides have wires 27 connected thereto and a millivoltmeter 28 is connected in series with these similar leads 27. With this arrangement the difference in temperature between the junctions or registering points 22 and 23 is indicated in millivolts on the voltmeter 28.

The average temperature difference, as experimentally determined, may be plotted against the spark advance, shown in flywheel degrees. Under non-detonating conditions, the plot of temperature difference versus spark advance has a given slope indicated by the line X on chart C, Figure 5. With the onset of detonation, the slope of the curve changes as indicated by the line Y on chart C. This gives a plot of two intersecting straight lines, the intersection Z of which definitely locates the point at which detonation begins. Thus, with this invention it is possible to accurately rate fuel and measure octane values in fuel by the borderline detonation method.

Having thus described the invention, what is claimed is:

1. A temperature change responsive device comprising a metallic body adapted to be subjected to a medium having variations in temperature and having parts simultaneously subjected to the same temperatures in said medium but having different heating rates by said medium, and a pair of conductors formed of metal differing from the metal of said body, one of said conductors being electrically connected at one end to one of said parts and the other being electrically connected at one end to the other of said parts, the opposite ends of said conductors being adapted to be connected across electrical potential responsive means.

2. A temperature change responsive device comprising a metallic body having threads formed on the exterior surface thereof and adapted to be screw-threaded in an opening leading to the combustion chamber of an engine, the inner end of said body being subjected to temperature changes in the fluid medium in said combustion chamber, said end of said body having parts simultaneously subjected to the same temperature in said medium but having different amounts of surface area exposed to said medium, and a pair of conductors formed of metal differing from the metal of said body, one of said conductors being electrically connected at one end to one of said parts and the other being electrically connected at one end to the other of said parts, the opposite ends of said conductors being adapted to be connected across electrical potential responsive means.

FLOYD A. WYCZALEK.

References Cited in the file of this patent
UNITED STATES PATENTS

| Number | Name | Date |
|---|---|---|
| 880,272 | Bristol | Feb. 25, 1908 |
| 903,090 | Hopkins | Nov. 3, 1908 |
| 1,422,672 | Coghlan | July 11, 1922 |
| 1,489,644 | Luscombe | Apr. 8, 1924 |
| 1,837,853 | De Florez | Dec. 22, 1931 |
| 1,987,642 | Schueler | Jan. 15, 1935 |
| 2,054,120 | De Florez | Sept. 15, 1936 |
| 2,139,504 | King | Dec. 6, 1938 |